Oct. 12, 1965　　　　J. H. ALEXANDER ETAL　　　3,212,088
RADAR DISPLAY SYSTEM
Filed Dec. 21, 1960　　　　　　　　　　　　　　　　3 Sheets-Sheet 1
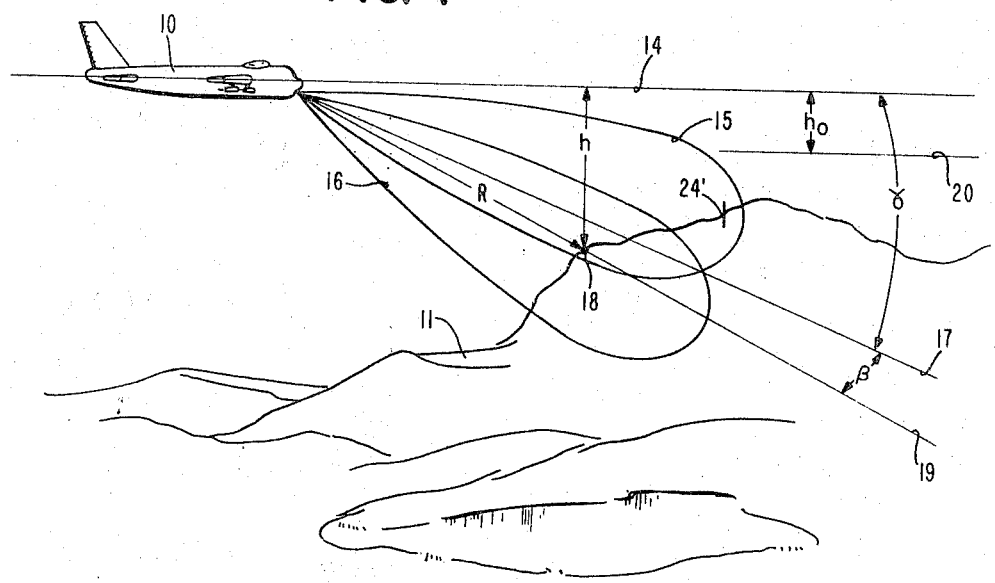
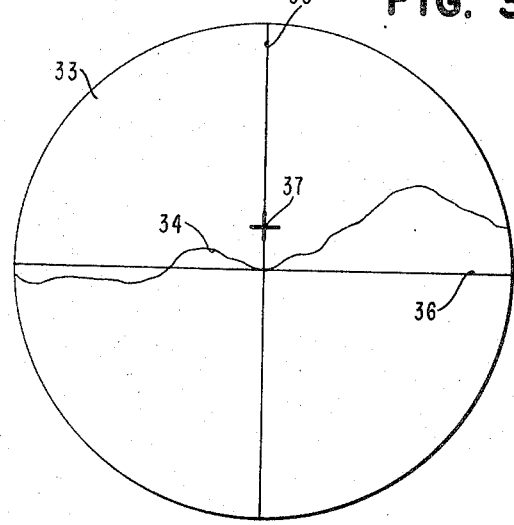
INVENTORS
JAMES H. ALEXANDER
GREGORY BARBIERI
JOE DIAZ
BY Paul D. Carmichael
ATTORNEY United States Patent Office 3,212,088
Patented Oct. 12, 1965

3,212,088
RADAR DISPLAY SYSTEM
James H. Alexander, Vestal, Gregory Barbieri, Endwell, and Joseph Diaz, Johnson City, N.Y., assignors to International Business Machines Corporation, New York, N.Y., a corporation of New York
Filed Dec. 21, 1960, Ser. No. 77,453
12 Claims. (Cl. 343—16)

The present invention relates generally to radar systems and more particularly to the provision of improved display means for use in airborne radar systems.

It is often desirable for an aircraft to fly very close to the ground. To accomplish this it is necessary to determine the character of the terrain a sufficient distance directly in front of and about the flight path of the aircraft in time to allow the pilot to react and take proper evasive action whenever required to avoid collision therewith.

Radar systems are employed for obtaining ranging information and have been suggested for use in acquiring information as to the elevation of the terrain ahead of a low flying aircraft. Many types of displays have been proposed and considered for presenting the radar ranging information to the pilot. One such display presents elevation as a function of distance on the face of a cathode ray tube to provide a vertical profile of the terrain directly in front of the aircraft along the flight path. This display is limited in that the pilot receives no information as to the character of the terrain on either side of the flight path. Evasive maneuvers must be made in elevation and the pilot cannot maneuver the aircraft in azimuth in safety. Another display is used in conjunction with a monopulse radar system providing a high data rate. The ranging information derived from the radar signals is presented on a Plan Position Indicator (PPI) as a function of the azimuth angle of the antenna. Any portion of the terrain projecting above a predetermined clearance plane will appear on the display device. The pilot may maneuver the aircraft in azimuth to avoid terrain obstacles but vertical maneuvers cannot be accomplished with safety since complete elevation information is not furnished by the display.

A still further display which has been proposed is the so-called "transverse profilometer" wherein the elevation of the terrain is displayed as a function of the azimuth position of the antenna. This display is very easy to interpret since the presentation corresponds to what the pilot would see when looking through the windshield of the cockpit.

The transverse profilometer display has been suggested for use in combination with a radar system employing a pencil-like beam of radiated energy. The radar antenna scans mechanically in both elevation and azimuth. One coordinate deflection means of the display device is energized in response to the azimuth position of the antenna while the other coordinate deflection means is energized in accordance with the vertical scan of the antenna. The electron beam is intensity modulated by the terrain and target returns. In this manner all terrain within a predetermined range interval is illuminated on the face of the display device to provide a transverse profile of the terrain. However, since the radar antenna scans in both azimuth and elevation and a pencil-like beam is employed, the data rate is quite low and the terrain profile presented is limited in azimuth, as for example, ten degrees on each side of the flight path. The limited presentation of the terrain profile to the sides of the flight path does not allow complete freedom of movement of the aircraft by the pilot in azimuth and the limited antenna scan precludes adequate navigational coverage. This is particularly true in the case of a large high speed aircraft whose responses are relatively slow.

Another radar system utilizes monopulse techniques to obtain a high data rate. The antenna apparatus is fixed in elevation and mechanically scanned in azimuth. A radar beam is transmitted and the incoming or return signals are simultaneously received on a pair of generally elliptical overlapping antenna patterns. The instantaneous ratios of the received signals are provided and these sum and difference return signals are processed by suitable computing apparatus to obtain a burst of elevation information corresponding to all elevations within a preselected range increment for each azimuth position of the antenna. A very large area is scanned in a relatively short time period due to the electronic vertical scan and the electronic computation of the elevation information.

Heretofore, the transverse profilometer display has not been combined with a high data rate radar system of the type above described. The transverse profilometer display is not adapted to be directly coupled with a high data rate radar system because of the instrumentation problems encountered in having the display device respond to and assimilate the bursts of radar elevation information. If a cathode ray tube is used as the display device, severe requirements are imposed on the deflection amplifiers since video frequencies are involved and to maintain the band width for the high deflection voltages required is extremely difficult. Also, the signal corresponding to the lowest elevation in any particular electronic vertical scan is received first. Since a solid brightness up to the maximum height of the terrain returns is presented on the face of the display device, noises and other spurious signals are difficult to reject whereby there may be no clear definition of the highest terrain in the area scanned.

Briefly, the present invention relates to a display means for a radar system wherein one coordinate deflection means of a display device, such as a direct view storage tube, is energized in response to the azimuth position of the radar antenna. The other coordinate deflection means is energized by a signal corresponding to the highest elevation detected during each electronic vertical scan of the radar apparatus. Each burst of radar elevation information supplied by the radar and computing apparatus, which corresponds to an electronic vertical scan, is peak detected to provide a signal corresponding to the highest elevation occurring in that burst and within the selected range gate. The arrangement is such that the peak detected signals operate the other coordinate deflection means whereby a single line is presented on the face of the display device which is an accurate and definitive presentation of the highest elevations of the terrain within a selected range interval along and to both sides of the flight path of the aircraft. A large area or sector is quickly scanned in azimuth whereby both azimuth and elevation maneuvers may be made in complete safety. This invention also relates to the use of further means, specifically a gated peak detecting means, in combination with the above-mentioned apparatus for obtaining signals indicative of the terrain elevation in a small sector in front of the aircraft which may be used to control an autopilot, for example. The autopilot controls the aircraft in response to these signals to change the flight pattern in accordance with the terrain.

It is the primary or ultimate object of the present invention to provide a radar display system wherein a transverse profilometer is employed with a high data rate radar system. The transverse profilometer provides a visual display which is easy to interpret and, when combined with a high data rate radar system, presents a single line indicating the highest elevations of the surrounding terrain over a large sector of scan. The pilot is presented with sufficient information to permit maneuvering of the aircraft in both elevation and azimuth to avoid terrain obstacles with safety.

Another object of this invention is to provide a radar display system wherein a signal corresponding to the highest elevation in each burst of radar elevation information representing an electronic vertical scan is obtatined by peak detecting such elevation information. The vertical deflections means of a display device is energized by these peak detected signals. A very accurate representation of the highest elevations in the scanned area is provided since noises and other spurious signals may be rejected by other means without adversely affecting the radar display system.

Still another object of the invention is to provide a system of the type above described which may be combined with other means to provide control signals for an autopilot or other types of indicating displays, such as the height need on an Instrument Landing System (ILS) indicator. Gated peak detecting means provide a signal indicating the highest elevation in a small portion of the sector of scan directly along the flight path of the aircraft.

A further object of the invention is to provide a radar display system having the characteristics set forth above which is highly simplified in operation and construction and which does not affect the other uses of the radar when the aircraft is operating at normal and higher altitudes.

The foregoing and other objects, features and advantages of the invention will be apparent from the following more particular description of a preferred embodiment of the invention, as illustrated in the accompanying drawings.

In the drawings:

FIG. 1 is a side elevational view of an aircraft flying close to the terrain with the overlapping receiving antenna patterns of the radar system and certain other relationships indicated thereon;

FIG. 3 is a front view looking at a display device showing the transverse profile of the terrain presented to the pilot.

Figure 2:
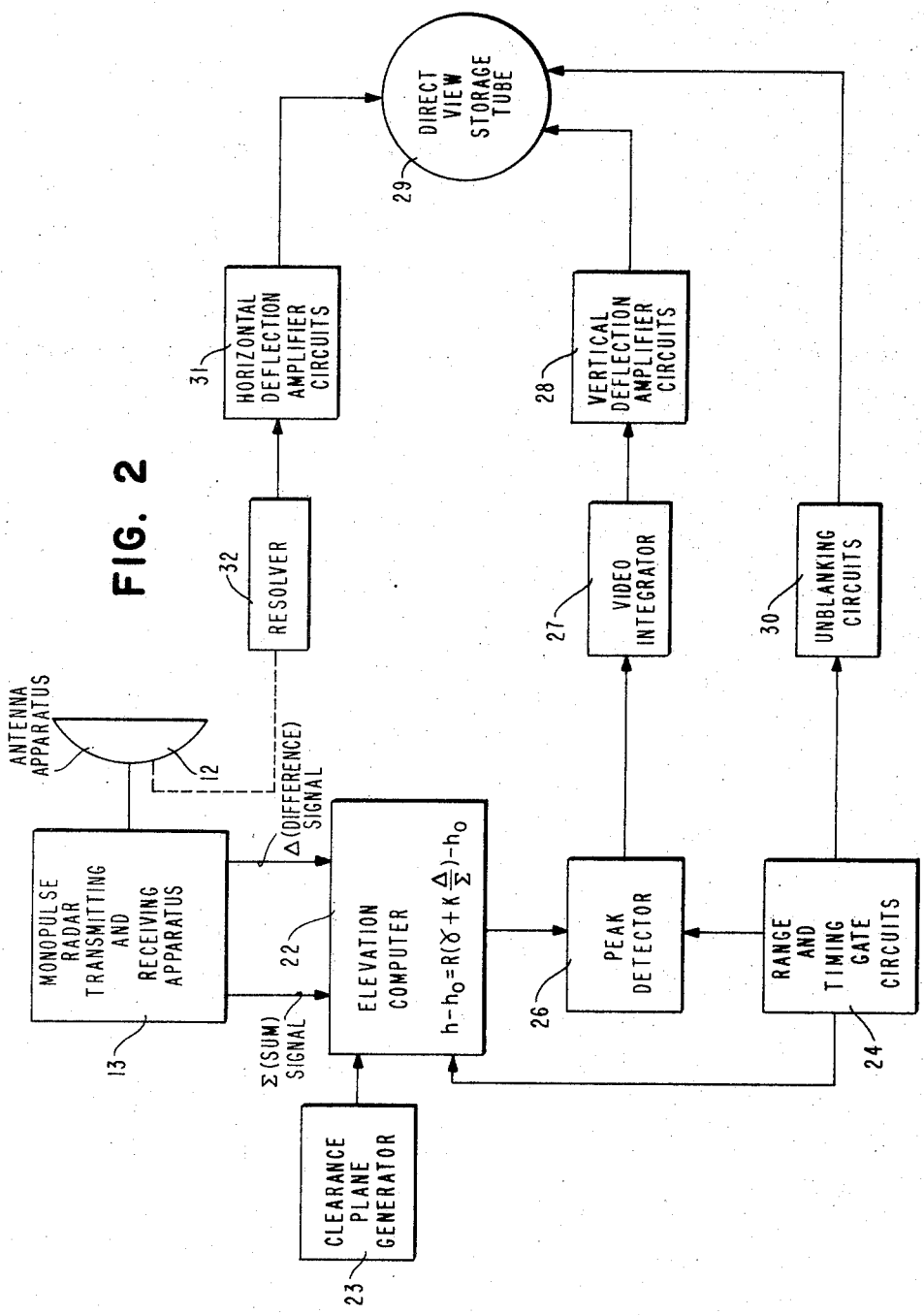
FIG. 2 is a schematic block diagram of a radar system embodying the techings of the present invention.

Referring now to the drawings, and initially to FIGS. 1 and 2 thereof, the reference numeral 10 designates an aircraft flying at a low altitude with respect to the terrain 11. The aircraft 10 is provided with a radar system employing monopulse techniques for obtaining a high data rate of information that is indicative of the elevation of the terrain along and to both sides of the flight path of the aircraft.

This radar system comprises antenna apparatus 12 and monopulse transmitting and receiving apparatus 13. The antenna apparatus is so mounted with respect to the aircraft 10 that microwave radar transmissions are directed toward the terrain at a relatively small angle with respect to the horizontal plane of flight of the aircraft. This horizontal plane of flight is designated by reference numeral 14 in FIG. 1 of the drawings.

During each transmission time, the radar transmitting and receiving apparatus 13 and the antenna apparatus 12 are operative to send microwave energy downward toward the terrain 11. The incoming or return signals are received on a pair of antenna patterns 15 and 16 which appear as vertical overlapped generally elliptical lobes. These lobes are directed downward toward the terrain 11 in accordance with the vertical position of the antenna apparatus 12 and with respect to the horizontal plane of flight 14. A point lying along a line 17 passing from the antenna apparatus 12 and through the common crossover point of the antenna patterns 15 and 16 will provide incoming signals of equal strength for these antenna patterns. The angle between the line 17 and the horizontal plane of flight 14 is referred to as the depression or boresight angle and is commonly indicated by the reference character $\gamma$ in the art.

In accordance with usual radar practice, the transmitting and receiving apparatus 13 is operative to periodically send out pulses of microwave energy. During the time intervals between transmissions, the radar transmitting and receiving apparatus 13 effectively listens for return signals from the terrain 11. For each transmission there will be a plurality of return signals that are sensed by the antenna patterns 15 and 16. Each particle of the terrain toward which signals are transmitted comprises a "target" for the radar and each return signal is a "target return." These return signals will correspond to each particle of the terrain along a given vertical line (depending upon the azimuth position of the antenna apparatus) within the range of the radar system. Thus, for example, a particle 18 of the terrain 11 located along a line 19 passing through the aircraft and displaced a certain angle $\beta$ with respect to the line of boresight 17, will generate a return signal which is sensed by each of the antenna patterns 15 and 16. These return signals from the particle of terrain 18 received on the two antenna patterns will vary in amplitude and phase. The antenna and transmitting and receiving apparatus have means for comparing these return signals to obtain the sum ($\Sigma$) and difference ($\Delta$) ratios thereof.

For those desiring a more detailed explanation of the theory of monopulse radar and apparatus for accomplishing the above, reference should be made to pages 1–10 and 33–35 of the book "Introduction to Monopulse" by Donald R. Rhodes which was published in 1959 by McGraw-Hill Book Company, Inc., New York. It should be understood that no claim is being made herein to the general concept of employing monopulse techniques to obtain a high data rate other than as embodied in the combinations hereinafter set forth.

As mentioned previously, the antenna apparatus is fixed in elevation and rotated in azimuth to provide a very high data rate. The scanning in elevation is accomplished electronically in that each particle of the terrain along a vertical line determined by the azimuth position of the antenna apparatus generates return signals for a single transmission by the radar system. It is thus possible to scan a large area in azimuth on both sides of the line of flight 14.

The elevation of any particle of terrain within a given electronic vertical scan can be determined since the angular displacement of this particle ($\beta$) with respect to the line of boresight 17 is given by the mathematic relationship:

(1) $$\beta = K \frac{\Delta}{\Sigma}$$

Where K is a constant of proportionality depending upon the design of the antenna apparatus.

The sign of the angle off boresight ($\beta$) is determined from the phase relationship of the sum and difference signals. If a given particle is below the line of boresight 17, the value of $\beta$ will be negative while if it is above this line, the value of $\beta$ will be positive as fully set forth in the above-identified book by Rhodes.

An examination of the geometry involved in FIG. 1 will disclose that the height of the aircraft ($h$) above any given particle reflecting signals during an electronic vertical scan is equal to:

(2) $$h = R \sin(\gamma + \beta)$$

Where R is the slant range from the aircraft to the given particle of terrain and is derived from the time the return signals are received with respect to the time the signal was transmitted by the radar system.

For small angles the sine of the angle is approximately equal to the angle in radians and in the present application $\gamma$ and $\beta$ are both small angles so that Equation (2) becomes:

(3) $$h = R(\gamma + \beta)$$

The pilot cannot fly the aircraft at the highest elevation within a vertical scan since collision with the terrain would result. To avoid this problem an artificial clearance plane 20 disposed a vertical distance $h_0$ below the actual plane of flight of the aircraft is provided. The distance $h_0$ is sufficient to compensate for thermal and wind disturbances in the atmosphere and normal pilot error. Thus, the vertical distance from the particle of terrain to the aircraft plane of flight ($h$) minus the vertical distance between the clearance plane and the plane of flight 14 of the aircraft can be expressed as follows:

(4) $$h - h_0 = R(\gamma + \beta) - h_0$$

Substituting Equation (1) into equation (4) we obtain:

(5) $$H - H_0 = R\left(\gamma + K\frac{\Delta}{\Sigma}\right) - h_0$$

It is the function of elevation computer 22 to perform the mathematical manipulation set forth in Equation (5) above. The sum and difference signals ($\Sigma$ and $\Delta$) and the basic ranging information are supplied to the computer by the monopulse radar transmitting and receiving apparatus 13. A signal corresponding to the fixed boresight angle $\gamma$ is fed into the computer along with a constant signal proportional to the vertical distance of the clearance plane ($h_0$). This latter signal is received from a clearance plane generator 23 which may comprise an adjustable potentiometer connected across a suitable source of direct current voltage. The computer may be of any desired construction capable of performing the required mathematical manipulations.

The computer also receives gating signals from range and timing gate circuits 24 whereby only those signals within a pre-selected range increment as, for example, those occurring in the distance between the aircraft and the line 24′ in FIG. 1 of the drawings are allowed to pass from the computer. A constructed embodiment of the invention employs three possible range selections. The smallest range increment is used when flying over relatively flat terrain, the intermediate range increment is utilized when traversing moderately rolling terrain and the largest range increment is used when flying over mountainous terrain. In this manner, a range increment best adapted for any particular type of terrain can be selected in order to give the pilot sufficient information in time to take evasive action as is required to avoid collision with the terrain. The range and timing gate circuits 24 also control the timing of the transmitted pulses of microwave energy and perform other functions to be hereinafter more fully described. These circuits may comprise multivibrators of the type disclosed on pages 569–573 of the book entitled "Electronic Fundamentals and Applications" by John D. Ryder, which was published in 1959 by Prentice-Hall, Inc., of Englewood Cliffs, New Jersey.

The elevation computer 22 provides a range gated output signal which is directly proportional to the quantity $h - h_0$ in Equation (5) above. This signal is a bipolar quantity and will vary between positive and negative values due mainly to the fact that $\beta$ will be positive if a given particle of terrain is above the line of boresight 17 and negative if the particle is below this line. For each transmission of the radar receiving and transmitting apparatus 13 the elevation computer will provide a range gated burst of elevation information that corresponds to all particles of terrain in elevation for a given azimuth position of the antenna apparatus 12.

The output signals of the elevation computer are passed to a peak detector 26 whose function is to select the signal from each burst of elevation information representing the highest elevation for the particular azimuth position of the antenna apparatus. The peak detector may be of the type shown and described on pages 503–507 of volume 19 of the Massachusetts Institute of Technology Radiation Laboratory Series entitled "Waveforms" and published in 1949 by the McGraw-Hill Book Company, Inc., of New York, New York. In essence, a capacitor is charged to the level of the signal representing the highest elevation in a given electronic vertical scan. The voltage signal on this capacitor at the end of an electronic vertical scan is therefore directly proportional to the highest elevation within that scan.

Immediately prior to receiving the elevation information from the elevation computer, the peak detector 26 is discharged from its previous setting to a reference level by a recycle trigger pulse. The recycle trigger pulse is supplied to the peak detector under the control of the range and timing gate circuits 24 whereby it is synchronized with the other portions of the radar system. The peak detector is then allowed to charge to a voltage level indicating the highest elevation in the next burst of elevation information supplied by the elevation computer.

After the peak detector has been charged to its maximum voltage level for a given burst of elevation information, the output thereof is coupled to a video integrator 27. The video integrator filters out the effect of system and received noise whereby the resultant presentation is relatively insensitive to and not substantially effected by noise and other spurious signals. For those desiring a more detailed description of a typical integrating circuit capable of use in the present application, reference is made to pages 550–553 of the above-mentioned book by John D. Ryder, entitled "Electronic Fundamentals and Applications."

The output signals of the video integrator 27 are passed to conventional vertical deflection amplifier circuits 28 of a direct view storage tube 29. A direct view storage tube is employed to provide a display of adequate brightness in the high ambient light conditions usually encountered in an aircraft cockpit. The video information from the vertical deflection amplifier circuits 28 is written on a storage mesh of the direct view storage tube rather than on a phosphor as would be the case in a conventional cathode ray tube. The storage mesh is continuously flooded with low velocity electrons which causes such electrons to be attracted or repelled. Those electrons which are attracted are then accelerated and used to write on a phosphor. A direct view storage tube which may be used in accordance with the teachings of the present invention is commercially available from the Radio Corporation of America, Camden, New Jersey, under their type number RCA7448.

The signals from the vertical deflection amplifier circuits 28 are coupled to the vertical deflection plates of storage tube 29. This causes the writing beam of the storage tube to be deflected vertically by an amount proportional to the elevation information. The writing beam of the storage tube is deflected vertically during each electronic vertical scan to a vertical position corresponding to the highest elevation in that vertical scan since the same is actuated by the output signals of the peak detector 26. As will be hereinafter more fully explained, the horizontal deflection means of the storage tube 29 is synchronized with the azimuth position and scan of the antenna apparatus.

At a time just prior to the end of a timing gate before the transmitting and receiving apparatus is operative to send out another burst of microwave energy, the range and timing gate circuits 24 actuate suitable and conventional unblanking circuits 30 to allow the storage tube to be unblanked instantaneously. A single spot of information corresponding to the highest elevation within a selected range interval for each electronic vertical scan is presented on the face of the storage tube. The unblanking circuits 30 may comprise a blocking oscillator as shown on pages 578–580 of the above-identified book by John D. Ryder. The blocking oscillator is triggered by the timing and gate circuits 24.

The horizontal deflection plates of the storage tube are energized by the outputs of conventional horizontal deflection amplifier circuits 31. These horizontal deflection amplifier circuits are driven by suitable circuit and transducing means, such as a resolver 32, in accordance with the instantaneous azimuth position of the antenna apparatus. For those desiring a more detailed description of resolvers and their operation, reference should be made to RICO Handbook No. 57, entitled "Resolver Handbook," which was published and copyrighted in 1954 by Reeves Instrument Corporation, 215 East 91st Street, New York 28, New York.

The horizontal or azimuth movement of the antenna apparatus is much slower than the electronic vertical scanning of the terrain. Consequently, the dots presented on the face of the storage tube—each dot representing the highest elevation within a selected range increment for a given vertical scan—are quite close together and merge to define a single line which provides a transverse profile of the highest elevations over a large azimuth sector in front of the aircraft within the selected range interval. In FIG. 3 of the drawings there is shown the face 33 of a direct view storage tube having a line 34 display thereon which is representative of the profile of the terrain in front of an aircraft over a large azimuth sector—one hundred and twenty degrees, for example. A pair of normally related crosshairs 35 and 36, which are stabilized with the position and ground track of the aircraft, are also presented on the face of the display device. For the pilot to fly the terrain it is only necessary that he keep the crossover point of the crosshairs 35 and 36 coincident with any point along the line 34 representing the transverse profile of the terrain.

The line 34 is really indicative of the height of the clearance plane above the terrain rather than the height of the aircraft itself since the elevation information supplied by the computer 22 is the quantity $h-h_0$ as set forth in Equation (5). Thus, when the crossover point of crosshairs 35 and 36 coincides with a point on the line 34, the aircraft is flying a distance above the highest elevation in the terrain equal to clearance plane distance $h_0$. A cursor 37 is also imposed on the face 33 of the display device which shows the actual position of the aircraft with respect to the highest elevation along and to both sides of the flight path. The pilot is able to fly close to the terrain and may make maneuvers in both elevation and azimuth in safety since sufficient information is presented to him. The electronic crosshairs 35 and 36 and cursor 37 are generated by apparatus well known in the art which is not shown or described in the present application.

Figure 4:
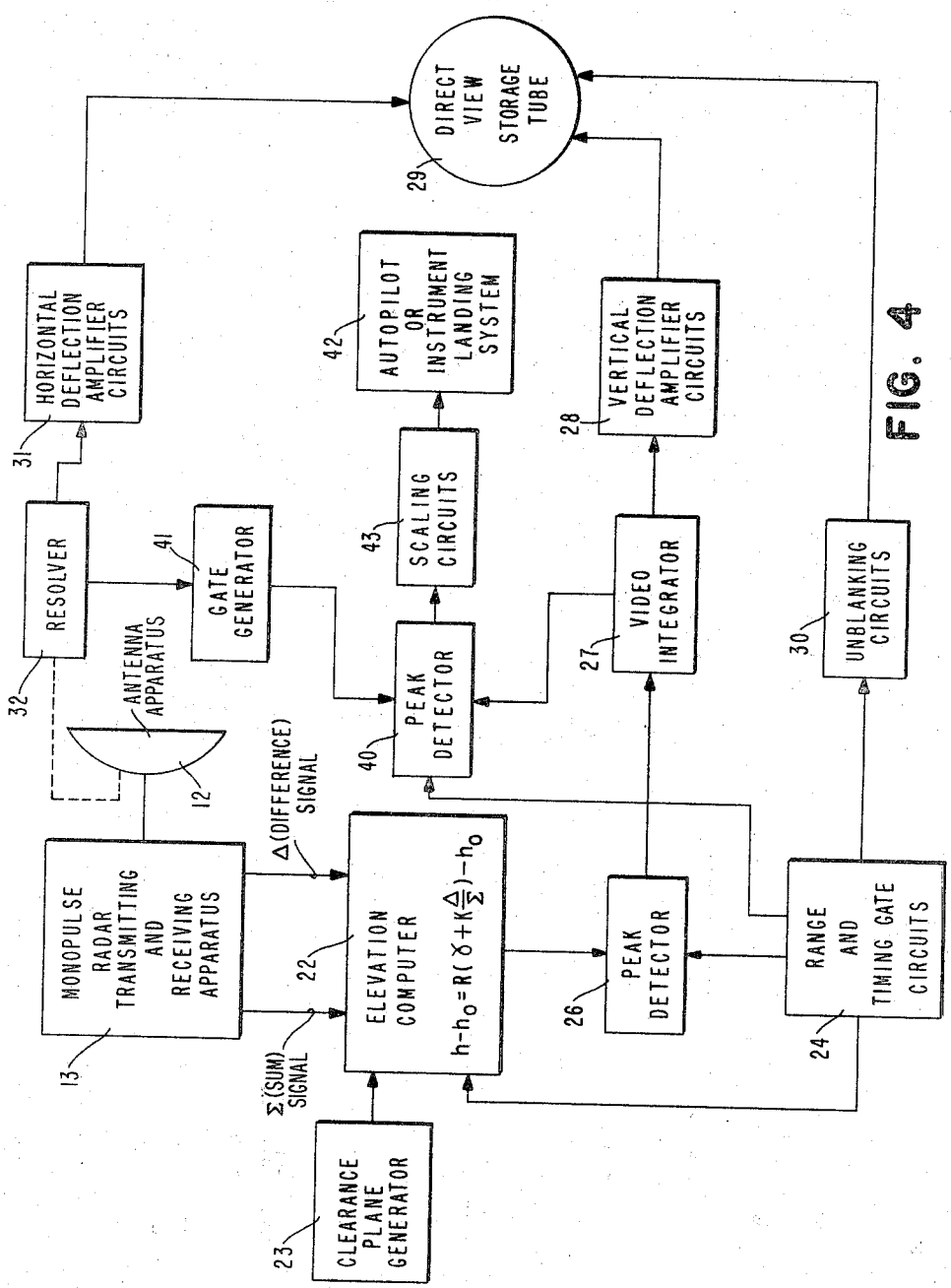
FIG. 4 is a schematic block diagram similar to that shown in FIG. 2 and including modifications for providing control signals for an automatic pilot or actuating the height needle on an instrument landing system indicator, for example.

Referring now to FIG. 4 of the drawings, there is shown a system of the type above described which has been modified to provide control signals to an autopilot or for actuating the height needle on an instrument landing system, for example. This system comprises many of the component portions previously described and, to avoid repetition in the specification, the description of these portions will not be repeated.

The outputs of the video integrator 27, which represent the highest elevations in the scanned sector, are passed to a peak detector 40. This peak detector 40 may be of the same type as peak detector 26 and is energized by a gate generator 41 which is in turn actuated in response to the azimuth position of the antenna apparatus by the resolver 32. The arrangement is such that the peak detector 40 is properly gated and actuated only during a small sector of scan about the aircraft flight path. For example, only those peak detected output signals from the video integrator occurring within a few degrees in azimuth on both sides of the flight path would be detected by the peak detector 40. Thus, the output of the peak detector 40 will correspond directly to the highest elevation of the terrain in front of the aircraft along the flight path within the selected small sector of scan.

After the capacitor of the peak detector 40 is charged to a voltage corresponding to the highest elevation directly in front of the aircraft and within the selected range interval, the voltage on the capacitor is fed into suitable scaling circuits 43. The output of the scaling circuits 43 is then transmitted directly to further apparatus 42. For example, the signal from the scaling circuits 43 may be used as a control signal for actuating an autopilot whereby maneuvers are automatically made in elevation to avoid collisions with the terrain. The apparatus 42 may also comprise a height needle of an instrument landing system.

It should now be apparent that the object initially set forth have been accomplished. Of particular importance is the provision of a radar display system wherein sufficient elevation information is presented to allow the pilot to maneuver the aircraft in both elevation and azimuth in safety. This is accomplished by combining the transverse profilometer display with a high data rate radar system by peak detecting the elevation information supplied by the elevation computer. Means are also provided for generating control signals for an autopilot or other apparatus without effecting the display of the elevation information.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A radar system for indicating the character of the terrain to the pilot of a low flying aircraft comprising radar means and a display device, said radar means having antenna apparatus fixed in elevation, means to move said antenna apparatus in azimuth, transmitting and receiving apparatus for sending out pulses of microwave energy and for receiving return signals from said terrain on a pair of antenna patterns, an elevation computer associated with said transmitting and receiving apparatus for providing a burst of signals corresponding to the elevation of the terrain for each azimuth position of said antenna apparatus, peak detecting means providing an output signal corresponding to the highest elevation occurring in each of said burst of signals, said display means having a pair of coordinate deflection means, one of said coordinate deflection means being energized in response to the output signals of said peak detecting means, the other of said coordinate deflection means being energized in response to the azimuth position of said antenna apparatus, and said display device displaying a line representative of the highest elevations within the scanned azimuth sector whereby the pilot may make evasive maneuvers in both azimuth and elevation with safety.

2. Apparatus according to claim 1 further characterized in that radar system comprises video integrator means disposed between said peak detecting means and said one of said coordinate deflection means to reduce the effect of system and other noise.

3. Apparatus according to claim 2 further comprising second peak detecting means responsive to said output signals of said first mentioned peak detecting means, means to gate said second peak detecting means to limit the operation thereof to a small sector in azimuth of said scanned azimuth sector about the flight path of the aircraft, and said second peak detecting means providing an output signal for controlling other apparatus.

4. A radar system for indicating the character of the terrain to the pilot of a low flying aircraft comprising radar means and a display device, said radar means comprising antenna apparatus movable in azimuth and providing a burst of signals corresponding to the elevation of all points of the terrain for each azimuth position of said antenna apparatus, means to detect the signal from each burst of signals representing the highest elevation of terrain for the related azimuth position of said antenna apparatus, said display device comprising a pair of coordinate deflection means, one of said coordinate deflection means being energized in response to the detected signals, and the other of said coordinate deflection means being energized in response to the azimuth position of said antenna apparatus.

5. Apparatus according to claim 4 further characterized in that said means to detect comprises a peak detector.

6. Apparatus according to claim 4 further comprising second means to detect, said second means to detect being responsive to said detected signals, and means to limit the operation of said second means to detect to those of said detected signals representing the highest elevations of terrain within a small azimuth sector about the flight path of the aircraft.

7. A radar system comprising radar means and a display device, said radar means having antenna apparatus movable in at least one direction and providing a burst of return signals corroseponding to all targets in a second direction for each position of said antenna apparatus in said one direction, means to detect the signal from each burst of signals representing a desired target from among said targets, said display means comprising a pair of deflection means, one of said deflection means being energized in response to the detected signals, and the other of said deflection means being energized in response to the movement of said antenna apparatus in said one direction.

8. Apparatus according to claim 7 further comprising integrating means disposed between said one said deflection means and said means to detect, unblanking circuits for said display device, gating means associated with said means to detect and said unblanking means, and said gating means actuating said unblanking circuits after each burst of return signals whereby a dot representing the desired target for each position of said antenna apparatus in said one direction is displayed on said display device.

9. A radar system comprising radar means, said radar means having antenna apparatus movable in at least one direction and providing bursts of return signals corresponding to targets differing substantially from associated background features in a second direction for each position of said antenna apparatus in said one direction, and means for detecting from each of said bursts of signals a signal representing a desired target wherein said signal representing occurs at any time within the associated bursts of signals.

10. Apparatus according to claim 9 further comprising second means for detecting, said second means for detecting being responsive to the signals detected by said first mentioned means for detecting means to gate second second means for detecting to limit the operation thereof to only a portion of said bursts of signals, and said second means for detecting providing a control signal representative of a desired one of said signals provided by said first mentioned means for detecting and occurring within said portion of said bursts of signals.

11. Apparatus according to claim 9 further comprising a display device having a pair of deflection means, one of said deflection means being energized by said signals detected by said first mentioned means to detect, and the other of said deflection means being energized in response to the position of said antenna apparatus.

12. An obstacle detection system comprising receiving means and a recording device, said receiving means comprising means movable in at least one direction and providing a burst of signals containing within said burst information corresponding to the objects in a second direction for each position of said receiving means in said one direction, a peak detector to detect a signal from each of said bursts of signals representing a pre-selected obstacle, circuit means interconnecting said means to detect and said recording device comprising gating means and means to actuate said gating means after each of said burst of signals, and said recording device being responsive to and recording the detected signals supplied by said means to detect.

References Cited by the Examiner

UNITED STATES PATENTS

| | | | |
|---|---|---|---|
| 2,467,361 | 4/49 | Blewett | 343—11 |
| 2,499,349 | 3/50 | Ayres | 343—11 |
| 2,574,853 | 11/51 | Ward | 343—7.4 |
| 2,747,179 | 5/56 | Kaplan | 343—17.1 |
| 2,866,191 | 12/58 | McFall et al. | 343—11 |
| 2,923,005 | 1/60 | Ross | 343—17 |
| 2,965,894 | 12/60 | Sweeney | 343—112.4 |
| 3,007,155 | 10/61 | Petrides et al. | 343—6 |
| 3,009,145 | 11/61 | Reeder et al. | 343—11 |
| 3,040,310 | 6/62 | Hausz | 343—7.3 |
| 3,082,418 | 3/63 | Milosevic | 343—11 |
| 3,127,604 | 3/64 | Herriott | 343—7 |

CHESTER L. JUSTUS, *Primary Examiner.*

KATHLEEN CLAFFY, *Examiner.*